United States Patent
Davis et al.

(10) Patent No.: US 10,641,745 B2
(45) Date of Patent: May 5, 2020

(54) METHOD FOR CHECKING FOR CONSISTENCY AND QUALITY COMPLIANCE IN AN ULTRASONIC SCANNING DATA FILE

(71) Applicant: VeriPhase, Inc., Birmingham, AL (US)

(72) Inventors: John Mark Davis, Hoover, AL (US); Archibald Leach Cobbs, Mountain Brook, AL (US); Charles Allan Hansen, Sterrett, AL (US); Nicholas James Bublitz, Chelsea, AL (US); Samuel Matthew Davis, Birmingham, AL (US)

(73) Assignee: VeriPhase, Inc., Birmingham, AL (US)

( * ) Notice: Subject to any disclaimer, the term of this patent is extended or adjusted under 35 U.S.C. 154(b) by 0 days.

(21) Appl. No.: 16/402,715

(22) Filed: May 3, 2019

(65) Prior Publication Data
US 2019/0257800 A1    Aug. 22, 2019

Related U.S. Application Data

(63) Continuation-in-part of application No. 16/375,611, filed on Apr. 4, 2019, now Pat. No. 10,598,636, and
(Continued)

(51) Int. Cl.
*G01N 29/44* (2006.01)
*G01N 29/04* (2006.01)
(Continued)

(52) U.S. Cl.
CPC ....... *G01N 29/4454* (2013.01); *B23K 31/125* (2013.01); *G01B 17/02* (2013.01);
(Continued)

(58) Field of Classification Search
CPC .... G01N 29/069; G01N 29/262; G01N 29/44; G01N 29/4427; G01N 29/4445;
(Continued)

(56) References Cited

U.S. PATENT DOCUMENTS

| | | | | |
|---|---|---|---|---|
| 6,813,949 B2* | 11/2004 | Masaniello | ............... | F17D 5/02 73/602 |
| 10,324,066 B1* | 6/2019 | Davis | ..................... | G01N 29/48 |

(Continued)

OTHER PUBLICATIONS

Lebowitz. "Evaluation of an Automated Ultrasonic Scanner." 1991 (1991) Retrieved on Jul. 5, 2019 (Jul. 5, 2019) from <https://lib.dr.iastate.edu/cgi/viewcontent.cgi . . . .

*Primary Examiner* — Natalie Huls
(74) *Attorney, Agent, or Firm* — The Gache Law Firm, P.C.; Russell C. Gache

(57) ABSTRACT

A method is disclosed to extract meta-data held in a weld scan data file and from such data determine whether the testing data is acceptable for review. A series of configuration parameters held in the scan data file are analyzed for inconsistencies and a select set of parameters are reviewed for codes and industry accepted standards compliance with recorded scan data. Additional qualitative tests may be implemented on the scan test file and unacceptable results may also provide guidance to the weld inspector as to whether continued review of the scan data file is worthwhile. Such consistency testing avoids wasteful activities reviewing a flawed weld scan data file and provides signals to operators to avoid the processing of such a file by weld scan analysis software when such processing will not result in successful assistance to a weld inspector.

20 Claims, 3 Drawing Sheets

US 10,641,745 B2
Page 2

Related U.S. Application Data a continuation-in-part of application No. 14/986,195, filed on Dec. 31, 2015, now Pat. No. 10,324,066.

(51) Int. Cl.

| | |
|---|---|
| *B23K 31/12* | (2006.01) |
| *G06F 16/14* | (2019.01) |
| *G01N 29/11* | (2006.01) |
| *G01N 29/26* | (2006.01) |
| *G01B 17/02* | (2006.01) |

(52) U.S. Cl.
CPC ........... *G01N 29/043* (2013.01); *G01N 29/11* (2013.01); *G01N 29/262* (2013.01); *G01N 29/4427* (2013.01); *G01N 29/4463* (2013.01); *G06F 16/148* (2019.01); *G01N 2291/015* (2013.01); *G01N 2291/0234* (2013.01); *G01N 2291/02854* (2013.01); *G01N 2291/044* (2013.01); *G01N 2291/267* (2013.01); *G01N 2291/2675* (2013.01)

(58) Field of Classification Search
CPC ....... G01N 29/4454; G01N 2291/0234; G01N 2291/044; G01N 2291/267; G01N 2291/2675; G06F 16/148; B23K 31/125
See application file for complete search history.

(56) References Cited

U.S. PATENT DOCUMENTS

| | | | |
|---|---|---|---|
| 10,551,351 B1* | 2/2020 | Davis | G01N 29/043 |
| 10,557,833 B2* | 2/2020 | Davis | G01N 29/44 |
| 2006/0076321 A1 | 4/2006 | Maev et al. | |
| 2007/0038400 A1* | 2/2007 | Lee | B23K 11/24 |
| | | | 702/103 |
| 2008/0072674 A1* | 3/2008 | Ume | G01N 29/0618 |
| | | | 73/627 |
| 2009/0164143 A1* | 6/2009 | Duckworth | G01M 5/0025 |
| | | | 702/38 |
| 2010/0064495 A1* | 3/2010 | Iizuka | G01N 29/043 |
| | | | 29/407.01 |
| 2011/0083512 A1* | 4/2011 | Imbert | G01N 29/0645 |
| | | | 73/622 |
| 2014/0238136 A1* | 8/2014 | Ten Grotenhuis | G01N 29/11 |
| | | | 73/592 |
| 2015/0346164 A1 | 12/2015 | St-Laurent et al. | |
| 2016/0231291 A1* | 8/2016 | Boulware | G01N 29/262 |
| 2016/0267806 A1 | 9/2016 | Hsu et al. | |
| 2017/0122909 A1* | 5/2017 | Goroshevskiy | G01N 27/82 |
| 2017/0182605 A1* | 6/2017 | Rajagopalan | B23K 9/32 |
| 2018/0031152 A1* | 2/2018 | Rajagopalan | B23K 37/003 |
| 2018/0136169 A1* | 5/2018 | Ume | G01N 29/04 |

* cited by examiner

METHOD FOR CHECKING FOR CONSISTENCY AND QUALITY COMPLIANCE IN AN ULTRASONIC SCANNING DATA FILE

This application claims the benefit of filing priority under 35 U.S.C. § 119 and 37 C.F.R. § 1.78 of the co-pending U.S. non-provisional application Ser. No. 14/986,195 filed Dec. 31, 2015, for a System and Method for the Improved Analysis of Ultrasonic Weld Data, and of co-pending U.S. non-provisional application Ser. No. 16/375,611 Ultrasonic Weld Analysis for Orthotropic Steel Decking Systems in Bridges filed Apr. 4, 2019. All information disclosed in those prior pending nonprovisional applications is hereby incorporated by reference.

FIELD OF THE INVENTION

The present invention relates generally to non-destructive testing of materials. In greater particularity, the present invention relates to the ultrasonic testing of welds and the interpretation of ultrasonic testing data after such testing.

BACKGROUND OF THE INVENTION

Ultrasonic testing (UT) is a family of non-destructive testing techniques based on the propagation of ultrasonic waves in the object or material tested. In most common UT applications, very short ultrasonic pulse-waves with center frequencies ranging from 0.1-15 MHz, and occasionally up to 50 MHz, are transmitted into materials to detect internal flaws or to characterize materials. A common example is ultrasonic thickness measurement, which tests the thickness of a targeted object to determine the thickness of the object. Pipeline walls are routinely measured in this manner from the exterior of the pipeline to check for internal laminations and wall loss (corrosion and erosion)

Ultrasonic testing is often performed on steel and other metals and alloys, though it can also be used on concrete, wood and composites, albeit with less resolution. It is used in many industries including steel and aluminum construction, metallurgy, manufacturing, aerospace, automotive and other transportation sectors.

In ultrasonic testing, an ultrasound transducer connected to a diagnostic machine is passed over the object being inspected. The transducer is typically separated from the test object by a "couplant" such as oil or water. Phased array ultrasonics (PA) is an advanced method of ultrasonic testing that has applications in medical imaging and industrial nondestructive testing. Common industrial applications are noninvasive examination of manufactured materials such as welds joining large sections of pipes or steel decking for bridges.

Ultrasonic testers are typically separated into two classes of devices. Single-element (non-phased array) probes, known technically as monolithic probes, emit a beam in a fixed direction. To test or interrogate a large volume of material, a single-element probe must be physically scanned (moved or turned) to pass or traverse the beam through the area of interest. In contrast, the beam from a phased array probe can be focused and swept electronically without moving the probe. The beam is controllable because a phased array probe is made up of multiple small elements, each of which can be pulsed individually at a computer-calculated timing. The term "phased" refers to the timing, and the term "array" refers to the multiple elements. Phased array ultrasonic testing or "PAUT" is based on principles of wave physics, which also have applications in fields such as optics and electromagnetic antennae.

In the non-destructive testing of material and welds, the phased array probe emits a series of beams to flood the weld with sound and a flaw can be seen or "read" on a display screen attached to the phased array ultrasonic tester, usually highlighting a weld "indication" or potential flaw as a colored indication on the instrument display screen.

There are two main methods of receiving the ultrasound waveform: reflection and attenuation. In reflection mode sometimes referred to as "pulse-echo" mode, the transducer performs both the sending and the receiving of the pulsed waves as the "sound" is reflected back to the device. Reflected ultrasound comes from an interface, such as the back wall of an object, geometry reflections, or other foreign objects or from an imperfection within the object such as a weld defect. The diagnostic machine displays these results in the form of a signal with an amplitude representing the intensity of the reflection and the distance, representing the arrival time of the reflection. In attenuation mode sometimes referred to as "through-transmission" mode, a transmitter sends ultrasound through one surface, and a separate receiver detects the amount that has reached it on another surface after traveling through the medium. Imperfections or other conditions in the space between the transmitter and receiver reduce the amount of sound transmitted, thus revealing their presence. However, as is known, couplants are needed to provide effective transfer of ultrasonic wave energy between the transducer probes and the objects being inspected to reduce or eliminate the attenuation from air to ensure enough ultrasonic energy is present inside the object so a useable ultrasonic response can be obtained.

For the testing of materials and in particular for the testing of welds, the pulse-echo method is preferred and various PAUT devices are offered in the non-destructive testing industry for such testing. For example, Olympus Scientific Solutions Americas Inc., (aka Olympus NDT) based in Waltham, Mass., offers a product under the name OmniScan/OmniPC which may be used to test steel structures for determining inspection compliance. Using such a product is often referred to as "scanning" a weld and such testing produces "scan data" representing the area tested which can be read back and reviewed at a time of choosing by an inspector. Such captured scan data can be saved in common data storage systems, such as cloud-based storage, and retrieved at any time for review using known PC based systems. Further, later and evolving systems can access such weld scan data and assist in the identification of potential weld defects by removing nominal or non-suspect scan data to lessen the amount of time required for an inspector to review the data and to focus attention on suspected areas that may represent a potential weld flaw.

A suitable procedure for taking scans, recording those scans, and then analyzing the scans to reduce the examination burden for the inspector is found in U.S. patent application Ser. No. 14/986,195, pages 7-22, and all referenced figures, all of which are hereby incorporated by reference. In association with standard ultrasonic weld analysis techniques, and using the procedure disclosed in the above referenced application for determining ultrasonic reflection amplitudes (i.e. "voxels"), weld seams may be non-destructively tested to determine code or procedural compliance. Further discussion regarding the use of a PAUT system, understanding the testing procedures for welds using such a system, the reading of a PAUT display, the reading of a display produced by an associated PC application to view testing data, and how to calculate the distances and dimensions provided by such a testing application shall not be provided as such information is either well understood or fully disclosed in the above referenced application, or not necessary for a complete and full understanding of the herein described invention.

However, such UT data processing (also referred to herein as UT data analyzer or a UT data analyzation) as described in the above referenced application, irrespective of the sophistication of a PAUT device used to capture the data, may be of little usefulness if the inspector has not correctly configured the system prior to or during testing of the targeted weld area, even if the scanning was done with automated motorized scanners. Phased array inspectors must be trained and certified in the use of PAUT systems, their settings and limitations, and well understand the materials being targeted by the PAUT device for scanning, and the operator must be vigilant to configure the testing device correctly in order to obtain valid scan results. If a device is incorrectly configured, the UT data processing will not assist the examiner and, worse, may delay the discovery of a flawed data file until that data file is well past data processing when access to the tested area may be difficult or impossible in an ongoing construction environment.

As will be understood, the arrangement, scheduling, and organization of testing of welds in a construction project are complicated in their own right, and the rescanning of a weld area to produce a valid scan data file may cause costly delays in a construction project, or even interfere with other scheduled processes causing cascading schedule delays. Moreover, an inspector may spend a great deal of time reviewing scan data only to discover during their data inspection that the captured data itself is flawed and not usable for their code or procedural compliance objectives, sometimes causing confusion as to the source of the data capture flaw causing even more lost time to determine the source of the scanning error. Hence, the incorrect configuration of a testing device by a PAUT inspector can cause confusion and cost in a construction project.

Therefore, what is needed is a method for determining at the earliest point possible after the creation of a scan data file, but at least prior to any further data processing used by a weld inspector for weld examination, whether such data is valid or flawed so that file or scan remediation may occur.

SUMMARY OF THE INVENTION

It is the object of the present invention to provide a method of extracting meta-data held in an ultrasonic data file and from such data determine whether the testing data is valid for review. A series of configuration parameters held in the scan data file are analyzed for inconsistencies and a select set of parameters are reviewed for compliance with indications given. Additional qualitative tests may be implemented on the scan test file and results provided as guidance to the inspector as to whether continued review of the scan data file is worthwhile. A minimum set of inconsistency tests is also presented that discern whether the scan file is flawed.

Other features and objects and advantages of the present invention will become apparent from a reading of the following description as well as a study of the appended drawings.

BRIEF DESCRIPTION OF THE DRAWINGS

A method incorporating the features of the invention is depicted in the attached drawings which form a portion of the disclosure and wherein.

DESCRIPTION OF THE PREFERRED EMBODIMENTS

Figure 1:
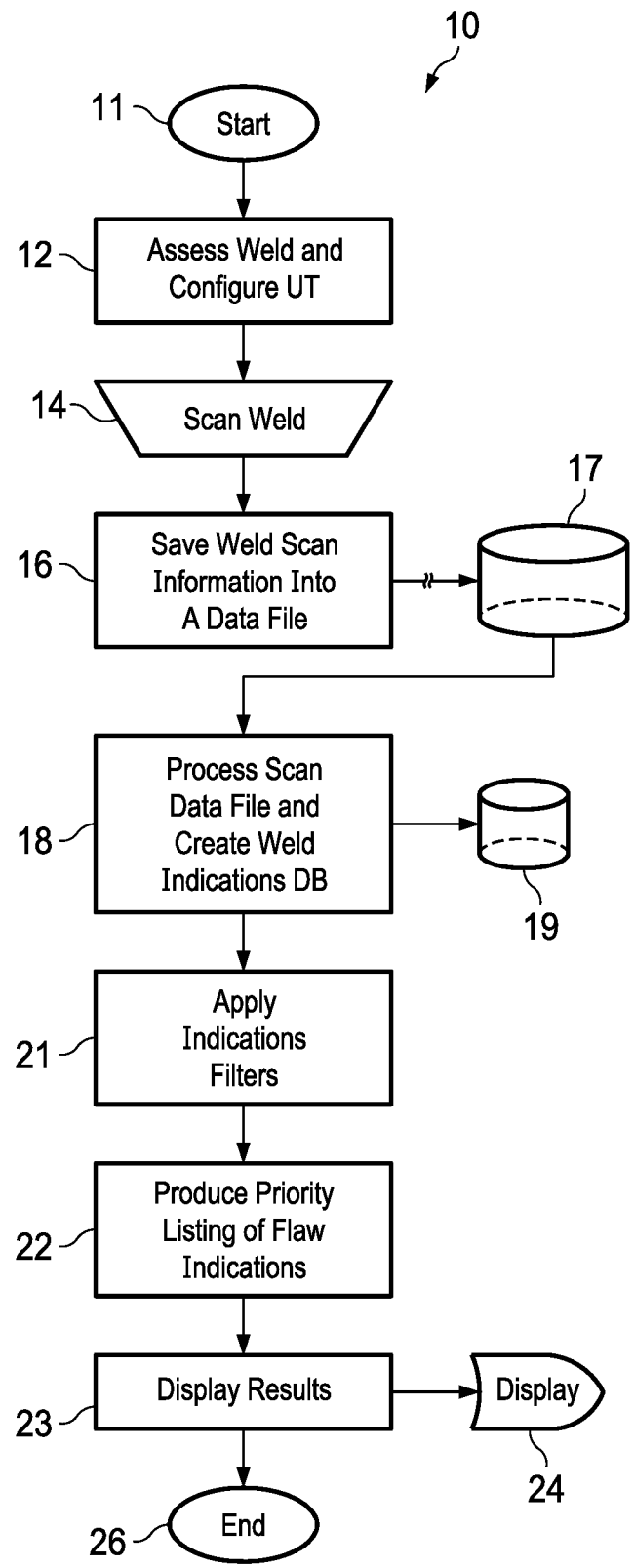
FIG. 1 a flow diagram showing the steps in collecting of scan data on a weld and the creation of a scan data file.

Referring to the drawings for a better understanding of the function and structure of the invention, FIG. 1 shows a method for collecting weld scanning data and the saving of such data into a scan data file for further analysis as disclosed in the above referenced U.S. patent application Ser. No. 14/986,195. As shown, system 10 shows a system that reduces the number of weld scan indications that an inspector must review in order to produce a report meeting applicable welding examination codes and requirements, such as those published by ASME, AWS, or other organizations. The system 10 is a standard software application that may run on a standard Windows™ operating system, such as for example Windows 7 or Windows 10 sold by Microsoft Corporation, running on a standard PC configuration. The system may also be incorporated as a module directly into existing testing and/or scan analysis software.

Initially, an inspector assesses a weld situation and then configures their PAUT equipment for a scan, including the positioning of the UT probe 12 adjacent to a target weld. The weld is scanned by the inspector 14 and a data file recording the weld scan data saved 16. The data may be saved locally on the UT device, transferred to a connected drive storage 17, or uploaded to a network drive via Wi-Fi or other data connection, depending upon the size of the data file. The scan file is then processed 18 by extracting all data cuboids that include potential weld flaw indications, essentially extracting all cuboids that have amplitudes greater than 0, and then creates a file recording of those indications and saves it in a local, fast access storage location 19. Further processing occurs on the indications file by applying a series of filters 21 that ranks and categorizes the indications into a usable form. In particular, a ranked list of indications is created in a table based on a ranking value for each indication which consists of multiple data cuboids. That priority listing of indications is then produced 22 and displayed 23 for the inspector's analysis at a place and time of their choosing.

The process shown in 10, referred to hereinafter as a UT data analyzer typically removes over 95 percent of the non-relevant data stored in a scan data file and presents a focused list of meritorious weld indications which is only a fraction of all indications and overall data held by a scan data file, and does so without degrading an inspector's ability to properly review the scan data in accordance with applicable code or procedural requirements.

Figure 2:
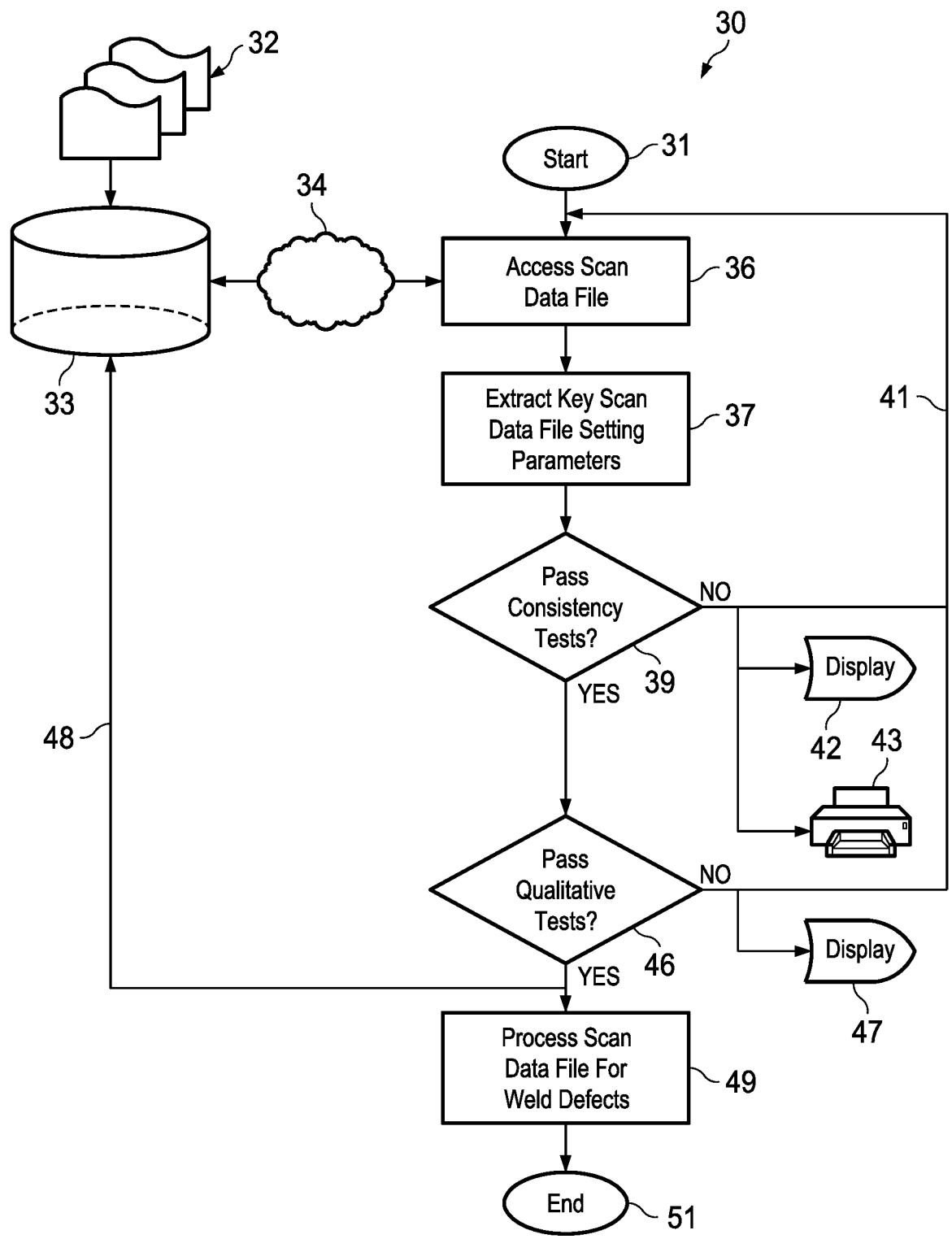
FIG. 2 is a flow diagram of top-level steps in the disclosed method.

However, in process 10 an assumption is made by the inspector reviewing the scan data file created in step 16 that the integrity of the data is consistent with acceptable testing practices in the weld scanning industry, and that such data meets minimum standards of weld practice analysis. Obviously, that may not be the case, so a system 30 is shown in FIG. 2 that can determine whether those minimum standards are met prior to the initiation of processing step 18.

The herein described invention is a software application held as an executable that may be initiated to pre-analyze a scan data file prior to further data processing. The application is a java-based application that runs in a normal PC environment under a common operating system, namely, Microsoft Windows incorporating an underling Dos OS as referenced above for the data processing software step 18 as part of process 10. The application may be part of a larger suite of tools that manages step 18 for an integrated review and processing of scan data files, or it may run as a stand-alone application invoked by a user command.

When invoked, the application reads the relevant configuration parameters or other necessary data from the scan data file. It then performs an analysis on the configuration parameters to verify that the parameters together and in combination represent a valid, correct and usable configuration. The results of this analysis are then presented to a human operator. The application may also work in conjunction with the UT data processing application described in FIG. 1, or work in a stand-alone configuration for processing a group of scan data files one after the other.

As is known, all data scan files for welds are accessible to retrieve data held in the data file using a helper application like available in most programmer's developer kits. For example, Olympus offers a data access library often referred to in the industry as the "DAL" from which third party applications may issue function calls to retrieve data from a scan data file, and for more complex data processing of the weld data file held in the scan data file. Hence, a software application may send continuous data query requests to the DAL for a targeted scan data file and responsively receive back the requested data for each query which is then held in RAM for further processing and use by the software application. Importantly, as is known, scan data files that record scanning information for a weld may include multiple scan files, sometimes referred to as "channels," because a separate scan file is created for each probe used to scan a weld. For example, it is common for an automated scanning system to use four scanning probes during a single scan pass of that weld, two for each side of a weld seam, so that a complete and comprehensive recording of the ultrasonic wave reflections from various angles around the weld may be obtained. Those separate recordings are saved as separate scan data files but are grouped automatically together as part of the information saved within the data file itself. Processing software can retrieve such information using the DAL and automatically group such separate scan data files together to represent a single scan of a weld seam. Further, as in extensive weld seams where a scanning process may encounter obstructions along the scanning path, the scanning of a weld seam may occur over multiple scan sessions, with each scanning session possibly using multiple probes. As is known, multiple sessions may be linked together by the operator selecting and inputting certain information in the scanning interface of the scanning device to indicate that separate sessions are part of a single scan of a weld seam. Some scanning devices such as the Olympus NDT OmniScan/OmniPC system can also merge the separate scan data files to provide an integrated view of the scan data to a weld inspector during analysis. Further information regarding the accessing of information in a scan data file, the grouping of scan data files, and integration of those files shall be omitted in as much as such information is well known in the industry and not necessary for a complete understanding of the herein recited invention.

After the scan data file is saved, a PAUT device can read-back the information and using the device review the information, or read-back the stored information in a separation application on a PC or similar computing device, both allowing for the visualization of the data and to make the data available for graphical review in any portion of the scan along the weld seam. In the case of the OmniScan device a scan data file is produced having an "OPD" file extension and the OPD file may be saved in computer storage and accessed in various ways as is understood. Each OPD file includes within the file structure configuration and setup information such as weld type, weld bevel angle, thickness of the pipe material, the ultrasonic velocity utilized, probe scan and index offset, probe skew, etc., and also includes information on how the scanning device was configured. Additionally, the overall scan length is recorded, and a sound path minimum value recorded for normalization of the scan file data. This information is held by the scan data file some of which is considered "meta-data" and is utilized by the process 30 as will be discussed.

Referring to FIG. 2, a scan data file or a related group of scan data files are accessed 36 from storage 33. Storage 33 may hold a plurality of scan data files 32 so that the system 30 may quickly process a group of scan data files in serial succession and report on each of those files in a processing order determined by a selection made by an operator of the application. Such a configuration allows for the instant processing of files deposited in storage 33 or the delayed processing of select files to take advantage of scalable processing systems such as Amazon's AWS services. Irrespective, the order and timing of processing of each file may be done locally on a stand-alone PC or in a non-collocated manner so that cloud file storage 34 may be utilized for both processing and the saving of data files to a central cloud-based storage and processing location, as may be understood.

As shown, key data is extracted 37 from the scan data file(s) that records the settings utilized in the scanning process. Those settings are then examined 39 to find inconsistencies that would make the scan data inaccurate, unacceptable, or simply too risky for a weld examiner to rely upon for further data processing, or such inconsistencies may make it impossible for the examiner to satisfactorily review and certify that the weld was compliant with weld code requirements. If the constancy test is failed, a display signal is sent to the attached monitor 42 to signify non-compliance and at the direction of an operator a report printed recording the non-compliance 43. A signal is also sent 41 to the system to allow it to proceed to check the next file in a queue of files 32 that may be awaiting processing. Upon passing the consistency tests, a second set of qualitative tests 46 may optionally be initiated. A qualitative test examines the quality of the data recorded in the data file and is not a meta-data based test in as much as the settings and configuration of the testing device is not the basis for test passage, but instead the test examines the quality of the data present, even when the settings of the device recorded in the scan data file may be consistent. For example, couplant insufficiency may lead to a reduction in reflection magnitude in indications of interest in a weld and would be considered a qualitative test. Even with data normalization techniques and statistical nominal exclusion practices, such reductions due to such couplant insufficiency or "couplant loss" may interfere with the ability for a UT data analyzer to properly remove nominal, non-indication scan data that does not reflect a potential weld indication, thereby missing a potential weld indication and more importantly risk nullification of the UT data processing usefulness if its results are perceived by weld examiners as unreliable. In particular, qualitative tests 46 may include a "couplant loss" or a "data drop out" test, which may be applied on a per-scan basis.

Upon the passing of the qualification test, a display indication may be sent to indicate passage 47 and a signal 41 sent to initiate the next scan file to be tested. Further, a signal may be sent as a flag 48 regarding the readiness of the file for processing by a UT data analyzer so that the file may be processed by the UT data analyzer 49 at an advantageous time, which may be immediate or at a later time when the assigned processing system has less competing demands.

Figure 3:
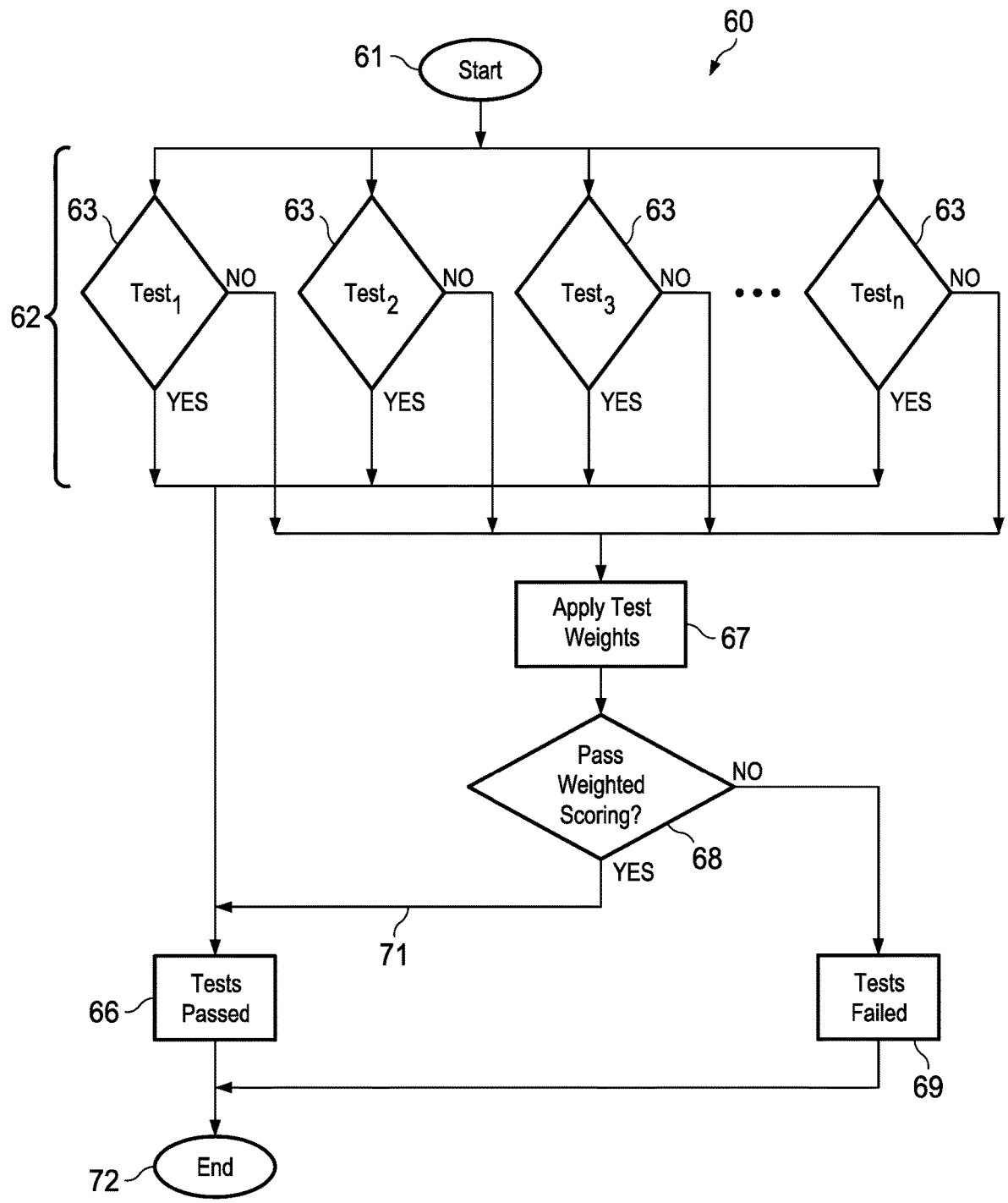
FIG. 3 is a detail flow diagram on the manner in which the configuration parameters are tested.

Referring to FIG. 3, it may be seen a plurality of individual consistency tests 63 that are utilized in step 39 to determine the suitability of the data scan file for further UT data processing. A set of tests 1-n 62 are initiated based on meta-data held in each scan data file and signals output to show whether each test is passed or failed. In the event that all tests are passed, a passage signal 66 is recognized and recorded for that scan file in a table record of tested files. Optionally, if any of the tests are failed, a weighting value may be applied to each test 67 and a further determination made 68 as to whether irrespective of any failed tests in grouping 62 the scan file still passes consistency testing.

In the preferred embodiment, tests 62 are applied as an absolute pass/fail criterion and the scan file rejected (i.e. failure) unless all tests are passed. However, a second embodiment would be the inclusion of the application of weights to each test and a summation of values measured against a minimum predetermined value as shown by the inclusion of step 68. The absolute embodiment is advantageous because processing demands are lessened, and certainty is provided as to the status of a tested scan data file. However, the second embodiment of weighted values may be preferred since certain PAUT device settings and configuration inconsistencies may not be fatal to the usability of a scan data file, or moreover those inconsistencies may only be catastrophic to the usability of the data in certain matched, secondary failures of other tests. Further, the repeating of any scanning operation is not trivial, and if the data is still suitable for an examiner to review, construction costs and delays may be avoided by continuing to rely on the data after editing and correcting the scan file meta-data when certain non-material tests are failed. For example, if either test numbers 2 or 3 in grouping 62 are failures, but not both, their independent individual failures may have an irrelevant impact to the integrity of the data and the data file should pass test consistency 39 (see FIG. 2). Alternatively, if tests 2 and 3 both fail then their dual failures may present a catastrophic failure condition and the fluid application of those weights 67 may compensate for such a condition while retaining the irrelevant condition of single independent failures of tests 2 and 3. As may be understood, the application of such weights may be fluid and dependent upon certain conditions resulting from the testing results themselves.

Irrespective of the method and complexity of the weighting process, if the weighted score fails step 68 a failure status is recorded 69 in a table recording the results and the file is further processed in accordance with the process 30 (see FIG. 2), which may include remediation of the scan data file. As is known in the art, remediation of a scan data file may be made without re-scanning of a weld. In some instances, a configuration setting may have been entered incorrectly by the operator during configuration of the scanning device and the setting may cause the failure of an inconsistency test 63. However, in many instances such an incorrectly entered setting may not substantively affect the quality of the data captured during scanning and the setting may be corrected by editing the scan data file. Subsequent to such editing, consistency test 39 may be re-applied and the scan file will pass.

In a further third embodiment, method 60 may include a pre-determined number of tests which the inventors have found to be a minimum set of consistency tests that a scan file must pass on an absolute basis in order for a scan file to have useful integrity. After experimentation, the inventors have found that this minimum set of tests represents a statistically high percentage of inconsistencies typically found in scan data files, such as greater than 80% of cases, so that additional tests do not need to be undertaken. In other words, if any of an identified minimum set of identified tests are failed, the scan file data is unacceptable, and the weld should be re-scanned, or the data file edited to correct benign configuration inaccuracies prior to proceeding to UT data analyzation. The preferred minimum test set is shown below under Table 1.0.

TABLE 1

| Test No. | Test Name | Type of Test | Test Description |
| --- | --- | --- | --- |
| 1 | Thickness | Consistency | Weld thickness is not consistent with other thickness indicators in the scan file or between other scan data files in a linked group |
| 2 | Weld Overlay | Consistency | Inconsistencies checked in Weld Overlay between linked data files |
| 3 | Index Offset/Skew | Consistency | Index Offset Value is checked to confirm correspondence with skew values |
| 4 | Single Side Exam | Consistency | Verification that single side exam or dual side exam is appropriately selected |
| 5 | Couplant Loss | Qualitative | Unacceptable Data Magnitude Loses |
| 6 | Data Drop-Out | Qualitative | Unacceptable Data Drop-Out Losses |

Referring to test No. 1 listed in Table 1, the test consists of determining if an inconsistency exists between the part thickness between groups of files. When data from multiple probes used to scan a single part is stored in separate files, the data in those files relating to the part itself should be consistent because all files refer to the same physical part. In particular, the part's thickness as recorded in each scan file should have an identical measurement and each scan file either as compared to a singularly input thickness value by an operator or, more commonly, as compared between thickness values recorded in a plurality of linked scan files, such as when multiple probes are used to scan the same weld. Similarly, the part's material and speed of sound as recorded in each file should be identical. In operation, the test retrieves the thickness value recorded in any of the scan data files and compares it to either an operator entered thickness value, or a thickness value held in all of the entered values in a group of linked data scan files. If any of these values do not match, the test is failed.

Referring to test No. 2 listed in Table 1, the test consists of determining if an inconsistency exists between weld overlays between groups of files. The position and shape of the weld itself, such as the relationship in space between two sides being welded (i.e. the weld bevel), is recorded in the scan data file. Because these files should be referring to the same weld, this recorded position and shape should be identical. Since weld bevel values are recorded as height and angle values with a high level of precision, all such values must agree, and they must also agree at a high level of precision. Hence, in operation the software simply compares the height and angle values for any arbitrary scan file with all other height and angle values. If any do not agree, then the test fails. Small differences may exist due to internal rounding errors, but such differences are on the order of 0.001% and are accounted for as part of the comparison calculation.

Referring to test No. 3 listed in Table 1, the test consists of determining if an inconsistency exists between the index offset value and the skew value. In a PAUT setup, the "index offset" is a measure of lateral position across the weld relative to a projected centerline along in the direction of the scan. Zero index offset represents the weld center line. To the left is represented by a negative index offset and to the right is represented by a positive index offset. "Skew" is an angular measurement that represents the direction in which a probe is facing relative to the centerline where zero (0) degrees represents orienting the probe during its movement along the weld centerline toward the movement direction, ninety (90) degrees represents orienting the probe right in a clockwise direction, and two hundred seventy (270) degrees means pointing to the left in a counter clockwise direction by ninety (90) degrees. Therefore, ninety (90) degrees will correlate to the negative index offset, and two hundred seventy (270) degrees will correlate to the positive index offset. Part of each probe's configuration includes recording index offset and skew values which are recorded in each scan data file. As is understood, orientation of any probe should be oriented (i.e. facing) toward the weld centerline as it moves along the weld centerline during the scanning process. Any probe with a negative index offset should have a skew of 90 degrees, and similarly a probe with a positive index offset should have a skew of 270 degrees. In operation, the invention compares the value of the skews for each probe with the index offset for that probe. If a probe skew value of 270 is not associated with a positive index offset, the test fails. Or, if the probe skew value for 90 degrees is not associated with a negative index offset value, the test fails. If any value outside of 270 or 90 degrees is encountered, the test also fails, and the operator can determine if an incorrect skew value had been entered during configuration of the device and the file potentially edited as a remediation action after failure.

Referring to test No. 4 listed in Table 1, the test consists of verifying that single side exam or dual side exam was appropriately selected during the scanning process. The index offset configuration is recorded in the scan data file as discussed above. Therefore, it is possible to tell from the probe configurations whether the probes were all located on the same side of the weld centerline (i.e. a single-sided examination), or were located on both sides (i.e. a double-sided examination). The software extracts and compares the values of each index offset value in each scan file and compares this information with the type of analysis (i.e. single-sided vs. double-sided) selected by the operator. In operation, this is calculated by comparing whether index offsets for all probes present are negative (i.e. singled sided should be selected), all present probes are positive (i.e. single sided should be selected), or probes are both positive and negative (i.e. double sided should be selected). Any deviation to these expected correlations will result in a failed test.

Referring to test No. 5 listed in Table 1, the Couplant Loss test consists of qualitatively determining if a data magnitude loss in the scan data file results in the data file being unreliable for further UT data processing to remove nominal data per process 10 (see FIG. 1). In the couplant loss test, the typical cause is that the PAUT probe is not securely coupled to the part under inspection, the transmissibility of sound is greatly reduced, and the measured amplitudes at a particular scan interval in the corresponding scan data file are consistently at or near a zero-amplitude level. In these situations, it can be inferred that couplant loss has likely occurred because every measured value in a particular scan interval in the scan is below some pre-determined threshold, for example below 5% FSH ("Full Screen Height"). FSH is a pre-configured calibration value corresponding to a maximum magnitude value that might be returned to a probe in the material being scanned. In a further consideration, portions of the scan data file that do not exhibit a typical burst of noise encountered at the beginning of each scan interval, such as is encountered just under the probe where the focused sound pattern has not yet converged, may be marked as suspected couplant loss intervals and may be a further confirmation of loss of signal. In any of these cases, a qualitative loss event is assumed because that is the most likely cause of such data magnitude losses.

In a data drop-out scenario (Test No. 6 in Table 1.0), the magnitude of each and every voxel at a scan interval is zero, sometimes illustrated by a black line in the graphical representation of the data on a device screen, or in some file formats a scan notation explicitly marks the scan interval as a "drop-out." A "drop-out" typically occurs when the scanning equipment is physically advanced forward too quickly, causing it to be unable to record scan data at every scan interval, with the result that the data for one or more scan intervals is entirely missing. When this occurs, the data file will typically hold all zeros for the missing scan interval(s) as a placeholder. The scan file includes the location of those intervals so a calculation may made as to whether a plurality of such losses at those recorded intervals indicates an unacceptable loss of data in the entire file or if such loses threaten the integrity of the entire data file.

Determining passage or failure of either qualitative tests Nos. 5 or 6 listed in Table 1, consists of qualitatively determining if a couplant loss or a data drop-out loss in the scan data file results in the data file being unreliable for further UT data processing to remove nominal indications per process 10 (see FIG. 1). This is accomplished by conducting 3 sub-tests for each potential condition, with losses at the start and end of the scan data file ignored as long as they start at the first interval and are at the end of the last interval. The first subtest determines if more than two data drop-outs or two couplant losses occur in a scan interval are adjacent or side by side. If they are, either or both tests 5 and 6 fail. The second subtest determines if there are two or more data drop-outs or couplant loses in any single inch of the scan data. The third subtest measures drop-outs or couplant losses of the entire scan data file with a maximum loss threshold of 5% total losses. A If any of these sub-tests fail in either a couplant loss or a data drop-out condition, the qualitative tests of No. 5 (couplant loss) or No. 6 (data drop-out), as the case may be, will fail and the system notes this per process 30.

While I have shown my invention in one form, it will be obvious to those skilled in the art that it is not so limited but is susceptible of various changes and modifications without departing from the spirit thereof.

Having set forth the nature of the invention, what is claimed is:

1. In a data file generated from the ultrasonic scanning of a weld in a metallic material, said data file including a plurality of scanning device configuration values, a method of verifying usability of said data file for a weld inspector to review industry compliance of said scanned weld, comprising the steps of:

a. accessing said data file and retrieving scanning device configuration values;
b. conducting a plurality of tests upon said retrieved configuration values to determine the existence of configuration inconsistencies in said data file based upon one or more predetermined consistency expectations to meet known industry compliance standards;
c. upon the condition of passing said tests, causing said data file to be processed by an ultrasonic data analyzer to extract all meritorious weld indications and produce a human discernable report about said indications; and,
d. upon the condition of a failure of said tests, sending a signal to a human operator indicating said same.

2. The method as recited in claim 1, wherein said step of conducting a plurality of tests comprises the steps of:
a. determining if the material thickness value held in said device configuration values does not match thickness values held by other data files for the same scanned weld;
b. determining if all weld bevel values are the same for all other data files for the same scanned weld;
c. determining if the recorded index values and skew values held by said data file are consistent with their weld centerline positions;
d. prior to said step of conducting a plurality of tests, selecting a dual or single side scanning processing configuration and determining if said dual or single side scanning configuration selection matches the expected probe orientation positions represented by the index offset values held in said data file; and,
e. determining whether said data file holds unacceptable data losses based on preconfigured loss thresholds due to couplant loss or data drop-outs.

3. The method as recited in claim 2, wherein said testing step is run iteratively on a group of data files held in computer storage until all files are processed and providing a status flag to said method for verifying usability of a data file as the passage status of each file being tested.

4. The method as recited in claim 1, wherein said step of conducting a plurality of tests comprises conducting a series of consistency tests on said device configuration values to determine whether said data file holds incompatible device settings values.

5. The method as recited in claim 4, wherein said step of conducting a plurality of tests comprises determining whether said data file holds unacceptable data losses based on preconfigured loss thresholds due to couplant loss or data drop-outs.

6. The method as recited in claim 5, wherein upon the condition that said data file fails said testing step, said data file is edited to correct configuration data in said file and said testing step is re-run upon said edited data file.

7. The method as recited in claim 4, wherein said step of conducting a plurality of tests further includes the steps of assigning a plurality of weighting values to each test and responsive to said weighting values determining if said data file passes said testing step based upon the combination of weighted results from each conducted test.

8. The method as recited in claim 1, wherein said step of conducting a plurality of tests comprises the steps of:
a. determining if the material thickness value held in said device configuration values does not match thickness values held by other data files for the same scanned weld;
b. determining if all weld bevel values are the same for all other data files for the same scanned weld;
c. determining if the recorded index values and skew values held by said data file are consistent with their weld centerline positions; and,
d. prior to said step of conducting a plurality of tests, selecting a dual or single side scanning processing configuration and determining if said dual or single side scanning configuration selection matches the expected probe orientation positions represented by the index offset values held in said data file.

9. The method as recited in claim 8, wherein upon the condition that said data file fails said testing step, said data file is edited to correct configuration data in said file and said testing step is re-run upon said edited data file.

10. The method as recited in claim 8, wherein said step of conducting a plurality of tests further includes the steps of assigning a plurality of weighting values to each test and responsive to said weighting values determining if said data file passes said testing step based upon the combination of weighted results from each conducted test.

11. The method as recited in claim 1, wherein said step of conducting a plurality of tests comprises determining whether said data file holds unacceptable data losses based on preconfigured loss thresholds due to couplant loss or data drop-outs.

12. The method as recited in claim 11, wherein said recited method of verifying usability of said data file is conducted selectively upon a group of scan data files held in computer storage in accordance with a predetermined priority criteria.

13. The method as recited in claim 1, wherein said step of conducting a plurality of tests comprises conducting a series of tests selected from the group consisting of:
a. determining if the material thickness value held in said device configuration values does not match thickness values held by other data files for the same scanned weld;
b. determining if all weld bevel values are the same for all other data files for the same scanned weld;
c. determining if the recorded index values and skew values held by said data file are consistent with their weld centerline positions;
d. prior to said step of conducting a plurality of tests, selecting a dual or single side scanning processing configuration and determining if said dual or single side scanning configuration selection matches the expected probe orientation positions represented by the index offset values held in said data file; and,
e. determining whether said data file holds unacceptable data losses based on preconfigured loss thresholds due to couplant loss or data drop-outs.

14. The method as recited in claim 1, wherein said step of conducting a plurality of tests comprises determining if the material thickness value held in said device configuration values does not match thickness values held by other data files for the same scanned weld.

15. The method as recited in claim 14, wherein said step of conducting a plurality of tests comprises determining whether said data file holds unacceptable data losses based on the magnitude of one or more scan intervals held in said data file not exceeding 5 percent of a maximum configured magnitude value of said scanning device.

16. The method as recited in claim 15, wherein said step of conducting a plurality of tests comprises determining whether said data file holds unacceptable data losses based on the presence of one or more scan intervals having values representing no data recorded.

17. In a data file generated from the ultrasonic scanning of a weld in a metallic material, said data file including a plurality of scanning device configuration values, a method of verifying usability of said data file for a weld inspector to review industry compliance of said scanned weld, comprising the steps of:
   a. step for accessing said data file and retrieving scanning device configuration values;
   b. step responsive to said retrieving step for conducting a plurality of tests upon said retrieved configuration values to determine the existence of configuration inconsistencies in said data file based upon one or more predetermined consistency expectations to meet known industry compliance standards;
   c. upon the condition of passing said tests step, step for causing said data file to be processed by an ultrasonic data analyzer to extract all meritorious weld indications and producing a human discernable report about said indications; and,
   d. Upon the condition of a failure of said testing step, sending a signal to a human operator indicating said failure.

18. The method as recited in claim 17, wherein said testing step comprises the following steps:
   a. step for determining if the material thickness value held in said device configuration values does not match thickness values held by other data files for the same scanned weld;
   b. step for determining if all weld bevel values are the same for all other data files for the same scanned weld;
   c. step for determining if the recorded index values and skew values held by said data file are consistent with their weld centerline positions;
   d. step prior to said step of conducting a plurality of tests for selecting a dual or single side scanning processing configuration and determining if said dual or single side scanning configuration selection matches the expected probe orientation positions represented by the index offset values held in said data file; and,
   e. step for determining whether said data file holds unacceptable data losses based on preconfigured loss thresholds due to couplant loss or data drop-outs.

19. The method as recited in claim 17, wherein said step of conducting a plurality of tests comprises conducting a series of tests selected from the group consisting of:
   a. step for determining if the material thickness value held in said device configuration values does not match thickness values held by other data files for the same scanned weld;
   b. step for determining if all weld bevel values are the same for all other data files for the same scanned weld;
   c. step for determining if the recorded index values and skew values held by said data file are consistent with their weld centerline positions;
   d. step prior to said step of conducting a plurality of tests for selecting a dual or single side scanning processing configuration and determining if said dual or single side scanning configuration selection matches the expected probe orientation positions represented by the index offset values held in said data file; and,
   e. step for determining whether said data file holds unacceptable data losses based on preconfigured loss thresholds due to couplant loss or data drop-outs.

20. In a data file generated from the ultrasonic scanning of a weld in a metallic material, said data file including a plurality of scanning device configuration values, a method of verifying usability of said data file for a weld inspector to review industry compliance of said scanned weld, comprising the steps of:
   a. accessing said data file held in a cloud-based storage location and retrieving scanning device configuration information held by said data file;
   b. Applying a plurality of consistency and data quality tests on said configuration information and data held by said data file, wherein said tests determine whether said data file is usable for extracting weld indications in a compliant manner as determined by preconfigured industry compliance expectations;
   c. upon the condition of passage of said tests, sending a signal to an ultrasonic data analyzer for said analyzer to extract all meritorious weld indications from said scan data file and producing a human discernable report about said indications; and,
   d. Upon the condition of a failure of said tests, sending a signal to a human operator indicating said same.

* * * * *